Dec. 17, 1935. W. McBAIN 2,024,239
UNITING OF STEEL PLATES OR OTHER STRUCTURES
Filed June 19, 1934
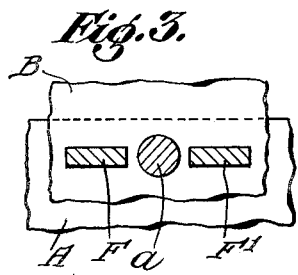
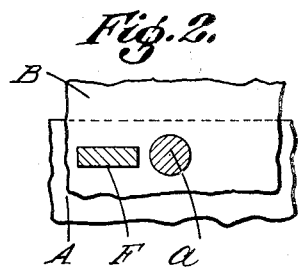
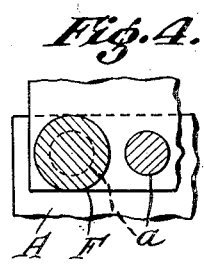
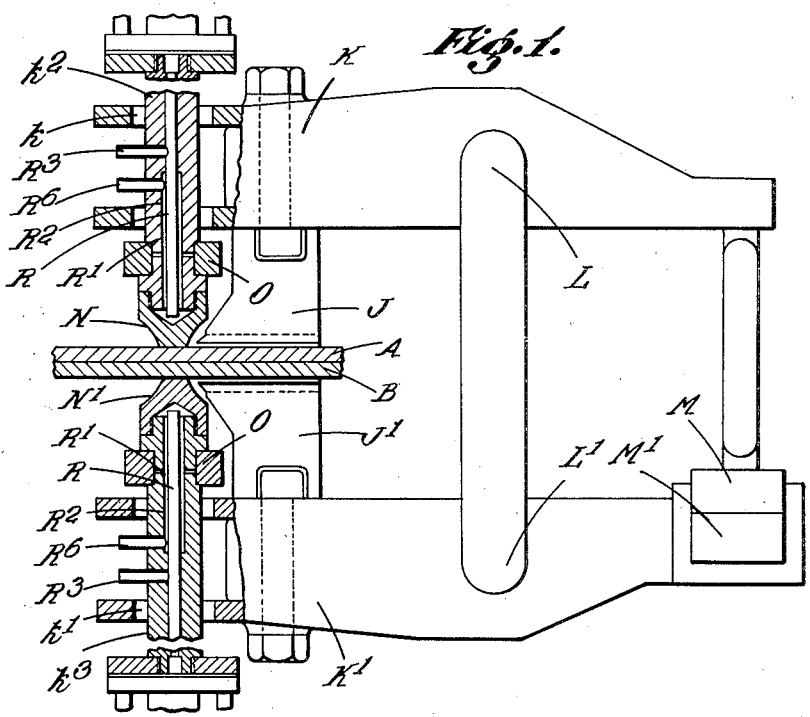
WILLIAM MCBAIN
INVENTOR
BY Haseltine, Lake & Co.
ATTORNEYS Patented Dec. 17, 1935

2,024,239

UNITED STATES PATENT OFFICE 2,024,239

UNITING OF STEEL PLATES OR OTHER STRUCTURES

William McBain, Newcastle-on-Tyne, England, assignor of one-half to Swan, Hunter & Wigham Richardson Limited, Newcastle-on-Tyne, England, a British company Application June 19, 1934, Serial No. 731,250
In Great Britain May 26, 1933

8 Claims. (Cl. 219—10)

This invention relates to the uniting of steel plates or other structures capable of being united by fusion or welding. The invention is more particularly although not exclusively intended for uniting iron or steel plates for ship building purposes. The terms "plate" and "steel" will hereinafter be employed for convenience of description, but it is to be understood that these terms are intended to refer to plates, various shapes of girders and angle irons and other structures whether made of steel or iron or of other material capable of being united by electric fusion or welding. The invention is also more particularly intended for connecting fairly thick or heavy plates for example from one quarter to an inch and a half thick.

The usual method of attaching steel plates together in ship construction is by riveting which is a somewhat lengthy and expensive method and is accompanied by other well-known defects particularly including the crushing and deformation of the rivet in some cases with consequential weakening. Ship builders have therefore considered the possibility of uniting the plates other than by riveting. The use of arc welding has been tried, but this requires preparation of the steel plates by shearing the edges or otherwise, and requires a supply of coils of welding metal apart from the plates to be united. For thin metal parts such as are employed in pressed metal work the parts can be united by spot welding, overlapping portions of said parts being heated to a welding temperature between jaws of copper or other conducting material by an electric current, and after the required temperature is attained the jaws are forced together with sufficient pressure to cause the heated portions to fuse together. Great difficulty has been experienced however in effecting welds of plates of upwards of ¼" thickness by this method as the pressure of the electrode jaws will cause considerable indentation on the surface of the plates to be welded together if sufficient pressure is applied to produce a proper union. Furthermore if the metal requires to be heated to so high a temperature that it becomes soft and plastic only very small pressures can be applied to the material between the jaws without cutting a hole completely through the material.

Attempts to clamp the plates by clamping jaws other than the electrodes have given rise to various defects. For example, if the clamping is effected within or too near to the fusion area the clamping jaws harmfully indent the plates and if the jaws surround the electrodes the plates tend to be forced apart between the electrodes so that arcing occurs between the plates and a hollow is produced in the middle of the weld. Moreover my experiments show that if the clamping jaws completely surround the electrodes or partly surround the electrodes to a sufficient extent substantially symmetrically about the electrodes, the area of the weld becomes smaller than should be obtained with the available current and electrodes, and this amounts to loss of electric current and is apparently due to an induced current or a magnetic action.

The main object of the present invention is to enable plates of ¼" to 1½" thickness or thicker to be attached together by satisfactory welds.

For uniting at least two superimposed plates they are clamped together with a pressure sufficient to produce complete contact in the area of fusion whilst the fusion is effected and the clamping is maintained until the material has sufficiently set. We have discovered that if the two overlapping surfaces to be welded are in actual and complete contact with one another a satisfactory weld between the surfaces can be produced without the addition of any further pressure than that necessary to produce this contact. With heavy plates the surfaces of which are not accurately finished there may be small gaps between the overlapping plates and a fairly heavy pressure is necessary to bring about the necessary proper contact, particularly if these plates are rusty or as is usual still retain the bloom. In ship building the plates are usually in this condition. If accurately machined parts are to be welded together proper contact between them may be obtained with somewhat less pressure. The pressure must however be applied outside the area being welded and we have found that the pressure should be applied not less than about ¼ of an inch distance from the welding area. The pressure applied may then be as heavy as possible without harmfully indenting the cold steel. In some of the tests which we have conducted with the production of satisfactory welds the pressure or total load applied to two overlapping plates was forty tons for two plates each ⅝ inch thick; sixty tons for two plates each ¾ inch thick and one hundred tons for two plates each ⅞ inch thick. The actual pressure per square inch on the area of the plates was varied in the tests by reducing the size of the clamping jaws until the metal plates were just indented. A fairly heavy electric current was found to be desirable and good welds were obtained with a current between the electrodes of about six or seven volts and twenty-seven thousand amperes. The current can however be varied somewhat according to other factors such as the thickness of the plate and the time allowed for passage of the current between the electrodes. In the tests above referred to the current was passed through the plates for each weld for twelve seconds for the ¼ inch plates; fifteen seconds for the ⅜ inch plates; twenty seconds for the ½ inch plates; twenty-five seconds for the ⅝ inch plates; twenty-five seconds for the ¾ inch plates; and thirty seconds for the ⅞ inch plates. The time, clamping pressures, and current, desirable for any particular work can be determined experimentally.

The clamping in position or together of the plates is preferably maintained for a time after welding until the heated steel has cooled and the weld is firmly effected. If desired after the material has been sufficiently heated and the electrodes removed, a clamping pressure may be applied over the welding area after the steel has partly cooled so that a forging effect is produced.

The clamping is preferably effected by hydraulic pressure whereby a heavy pressure can be maintained and readily controlled. The area over which pressure is applied may be an annular one surrounding the parts to be fused, but pressure may be applied at any position outside the welding area which will give the necessary contact in that area. The electrodes may also be pressed against the plates hydraulically. The pressure of the electrodes against the plates will preferably only be sufficient to ensure proper contact of the electrodes with the plates.

The welds may either be spaced apart or may overlap to form a continuous welded joint, in which case the least width of the weld should be at least as wide as the thickness of one of the plates.

The welding area should not approach too near to free edges of the plates because if the welding area is too near to the edge the latter will sometimes give way and the molten metal will escape and the weld will accordingly be spoilt. Also if the weld is too near to the edge there is a danger of the molten metal escaping past the edge between the plates. We have found that the welding area can approach to within about ¼ of an inch from free edges of the plates. The amount of overlap of the plates will accordingly allow for such distance from the edges. The welding area may however approach to an edge or near to an edge which is not a "free" edge as above referred to; for example, if an edge is near to or in contact with an edge of another plate, the welding area may extend over both edges to unite these edges together.

If the electrodes are brought so near to the edges of the overlapping plates that the area of softened metal extends to the edges it would be difficult to confine the molten metal even if stepped clamping jaws were provided to fit against the edges of the plates, and the jaws might be damaged by the heat. In any event plates such as are used in ship building vary somewhat in thickness and difficulties will be experienced in obtaining proper contact at each part of the stepped jaws. With a view to avoiding the latter defect one part of the stepped jaw may be resiliently mounted with respect to the other part and if desired the jaws may be faced with heat resisting material at the appropriate part. Whilst such stepped jaws may not enable the welding area to extend to the edges of the plates they may enable the welding area to be brought a little nearer to the edges.

We have found that the welding area will be substantially the same as the area of the electrodes if these are similar to each other and located opposite to each other. If circular electrodes are displaced with respect to each other an oval weld will be formed of somewhat elongated shape which may be desirable in certain circumstances.

It is not necessary to provide a layer or coating of insulating material provided with gaps for the weld between the plates as has been suggested in a welding process in which clamping pressure was to be applied immediately within the welding area.

If desired the edge of each plate may be bent slightly away from the other plate so as to avoid any rough edge on the plate holding the plates apart.

The pressure area will not surround the fusion area but may be applied on one side or on both sides along the line of the weld or transversely thereto and the weld may be circular, rectangular, or of any other desired shape.

The welding apparatus may be constructed as a portable apparatus for moving along the plates or as a stationary apparatus on which the plates or other parts are moved.

The accompanying drawing illustrates certain features of the invention:—

Fig. 1 illustrates a welding apparatus by means of which the invention may be carried out so as to manifest the features thereof.

Fig. 2 illustrates two work pieces in fragmentary form with a welding area and the clamping area indicated thereon.

Fig. 3 is a similar view showing two clamping areas spaced at two sides of the welding area.

Fig. 4 is also a similar view wherein the clamping area is shown as much greater than the welding area.

Throughout the views the same references indicate the same or corresponding parts.

In the practice of my invention I prefer to use a welding machine such as, for example, shown in Fig. 1 and as particularly indicated in Fig. 2, the clamping not effected by rectangular jaws, while Fig. 3 shows how the pressure may be applied by rectangular jaws $F$, $F^1$, on both sides of the weld area $a$.

As shown in Fig. 4 the clamping jaws $F$ can be moved over the welding area $a$ to make a forged weld after the metal has cooled sufficiently to avoid damaging the clamping jaws. The clamping area will preferably be as large or larger than the area $a$ although an area such as shown in Figure 13 produces good results. When the forged area has sufficiently set further pressure can be applied and the next weld effected, or, alternatively, if desired jaws on one side of the weld area (as in Figure 3) may be utilized solely for the forging, whilst the jaws $F^1$ on the other side of the weld are utilized solely for clamping the plates together. The clamping jaws may have various shapes; for example they may have flat clamping surfaces of circular or other shape, or said surfaces may be convex, or one jaw may be concave and the other convex, or both may be concave, or said surfaces may be in the form of narrow rectangles.

As already stated, the apparatus of Fig. 1, while relatively simple and capable of being substituted by other devices for the present purpose, nevertheless forms a preferred form of apparatus which we have used to produce successful welds. Two oppositely disposed rectangular clamping jaws J, J¹, engage the steel plates A, B, respectively at their overlapping portions. The jaws J, J¹, are mounted on the forward ends of arms K, K¹, respectively, and are pivoted between their ends at the positions L, L¹. The rear ends of the arms K, K¹ are forced apart to cause the jaws to clamp the plates by a hydraulic ram and cylinder M, M¹, respectively. The two electrodes N, N¹, are located adjacent to the jaws J, J¹, and are associated with conductor arms O, O¹ to which electric current is supplied from any suitable source (not shown). The conductor arms O, O¹ are located between the arms K, K¹. The forward ends of the arms K, K¹ are apertured as at $k$, $k^1$ to receive electrode rods $k^2$, $k^3$ respectively that carry the electrodes and are associated with suitable means for pressing the electrodes against the plates. The said means may comprise a hydraulic ram or spring loaded means or said means may be spring loaded in one direction and hydraulically controlled in the other direction. Suitable means, not shown, may be provided for controlling the hydraulic pressure and the electric current supplied to the electrode and a combined hydraulic pressure and electric current control may be provided. One of the arms K, K¹ may be provided if desired with a lever whereby the jaws can be moved apart manually.

The electrode rods are hollow and each contains a tube R between which and the electrode body R¹ is an annular space R². Cooling medium, such as water, is supplied to the tube R through an inlet R³ and the medium passes downwardly to the electrode end $n$ and then escapes upwardly through the space R² and out through an outlet R⁶. The electrode end R⁵ is made detachable so that this can be renewed if damaged.

We have found that if the arms K, K¹, are between the electric leads or conductor arms O, O¹ to the electrodes, an undesirable magnetic effect is produced on the apparatus, and we therefore introduce the conductor arms or leads between the arms K, K¹. Manifestly, variations may be resorted to and certain features of the invention may be used without others within the scope of my invention.

What I claim and desire to secure by Letters Patent of the United States is:—

1. A method of uniting metal structures comprising clamping said structures in position for welding, said clamping being adjacent the welding area and in two separate areas on opposite sides of the welding area but spaced therefrom a sufficient distance to avoid harmful or undesirable indentation of the work, applying electric current and pressure in the welding area to effect a weld, discontinuing the welding current and then applying a forging pressure to the welding area until the metal of the weld sets.

2. A method of uniting metal structures comprising, clamping said structures in position for welding, said clamping being adjacent and wholly exterior to the welding area in an area disposed at solely one side of said welding area but spaced therefrom a sufficient distance to avoid harmful or undesirable indentation of the work, applying electric current and pressure in the welding area to render the work plastic and effect a weld, discontinuing the welding current and then applying a forging pressure to the welding area until the metal of the weld sets.

3. A method of uniting metal structures comprising, clamping said structures in position for welding, said clamping being adjacent and wholly exterior to the welding area in an area disposed at solely one side of said welding area but spaced therefrom a sufficient distance to avoid harmful or undesirable indentation of the work, applying electric current and pressure in the welding area to render the work plastic and effect a weld, discontinuing the welding current and then applying a heavy forging pressure upon the entire welding area sufficient to press back the metal of the structures being welded into original form from that into which it tends to be distorted by the welding heat.

4. A method of uniting metal structures comprising, clamping said structures in position for welding, said clamping being adjacent to the welding area and amounting to at least four tons per square inch of the clamped area but being less than and sufficiently spaced from the welding area to avoid harmful or undesirable indentation of the work, applying electric current and pressure in the welding area to render the work plastic and effect a weld, the clamping area surrounding the points at which the current is applied to an extent which is sufficiently small to avoid reducing the effective welding area and to avoid forcing the structures apart at the points where the current is applied to said structures, discontinuing the welding current and then applying a forging pressure to the welding area until the metal of the weld sets.

5. A method according to claim 4, wherein the forging pressure is applied to an area upon the structures to be welded which extends across the heated area and also across a sufficient area of cooler metal adjacent to said heated area to avoid indenting the heated metal, and which pressure is sufficient to force back the structures into original form from that into which the welding heat tends to distort them.

6. A method according to claim 2, wherein the area upon which the forging pressure is applied extends over the welding area and over a sufficient adjacent cooler area to support the pressure and avoid indentation of the structures being welded.

7. A method according to claim 2, wherein the area upon which the forging pressure is applied extends past the area to which the current is applied and over a sufficient adjacent cooler area to support the pressure and avoid indentation of the structures being welded.

8. A method according to claim 2, wherein the area upon which the forging pressure is applied covers the plastic welding area and an adjacent area completely surrounding the welding area to a sufficient extent to support the applied pressure and avoid indentation of the work.

WILLIAM McBAIN.